Figures 1, 2:
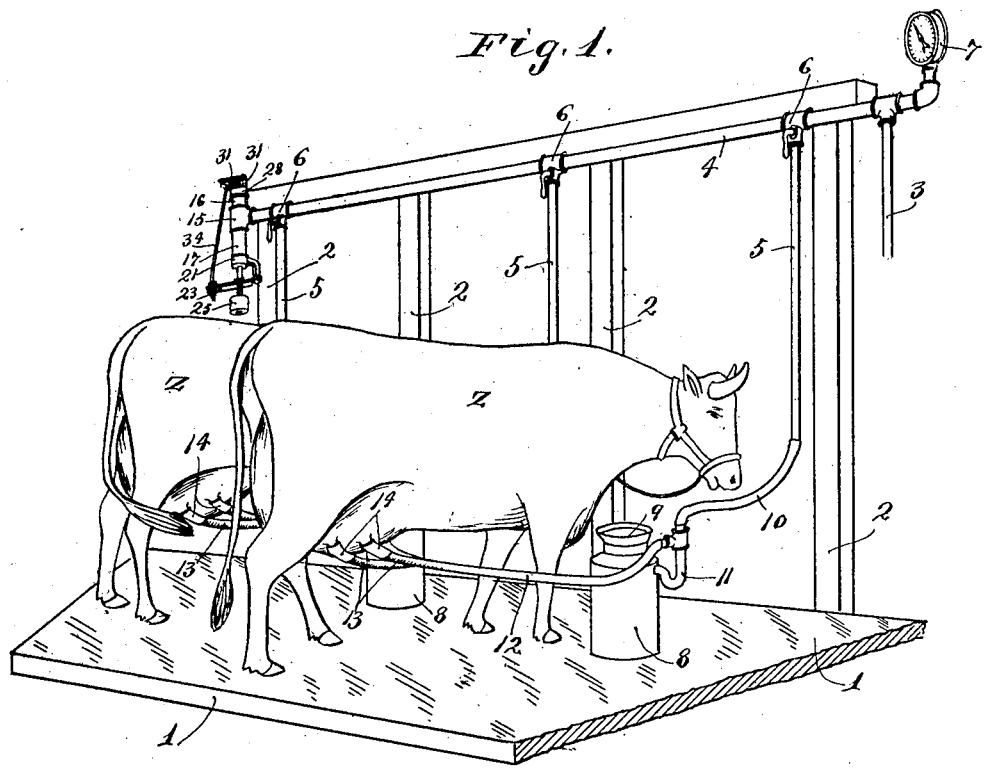

No. 875,706. PATENTED JAN. 7, 1908.
E. E. GOOD.
PULSATING DEVICE FOR MILKING APPARATUS.
APPLICATION FILED FEB. 11, 1907.

Witnesses.
A. H. Opsahl.
H. L. Kilgore.

Inventor.
Ezra E. Good.
By his Attorneys
Williamson & Murchan

UNITED STATES PATENT OFFICE.

EZRA E. GOOD, OF WATERLOO, IOWA.

PULSATING DEVICE FOR MILKING APPARATUS.

No. 875,706.  Specification of Letters Patent.  Patented Jan. 7, 1908.

Application filed February 11, 1907. Serial No. 356,674.

*To all whom it may concern:*

Be it known that I, EZRA E. GOOD, a citizen of the United States, residing at Waterloo, in the county of Blackhawk and State of Iowa, have invented certain new and useful Improvements in Pulsating Devices for Milking Apparatus; and I do hereby declare the following to be a full, clear, and exact description of the invention, such as will enable others skilled in the art to which it appertains to make and use the same.

My invention relates to cow milking apparatus of that general character wherein the milk is drawn from the cow through tubes and by the action of suction or partial vacuum produced in said tubes by an air pump.

Hitherto, devices for producing pulsations or variations in the suction or partial vacuum have been provided in this class of apparatus, the purpose of these pulsations being to produce a milking action more nearly like to that produced by the hands in the ordinary milking action, and also thereby increase the efficiency of the apparatus and, furthermore, to produce an action which is more agreeable to the cow. A pulsating device for the above purpose is disclosed and claimed in my prior patent No. 812,842 of date February 20, 1906, entitled "Milking apparatus."

My present invention very greatly improves the action of these pulsating devices and accomplishes the result by the provision of means for automatically opening a vent valve when the maximum suction or vacuum is reached, and for positively holding such vent open until the suction has been relieved, or otherwise stated, the vacuum has been reduced by the admission of air to the minimum.

The improved device is illustrated in the accompanying drawings, wherein like characters indicate like parts throughout the several views.

Referring to the drawings, Figure 1 is a perspective view, illustrating my invention incorporated in a milking apparatus attached to the stalls of a barn and applied to several cows; and Fig. 2 is an enlarged detail, principally in vertical section, but with some parts in full, illustrating the construction of the improved pulsating device.

The numeral 1 indicates the floor and the numeral 2 the stall posts rigidly secured in the usual or any suitable way. The character $z$ indicates the cows within the stalls, and which are being milked by the apparatus.

The numeral 3 indicates an air pipe which leads to an air pump (not shown) by means of which the partial vacuum is produced in the various pipes and tubes of the milking apparatus. At one end, the pipe 3 leads from a horizontally extended pipe 4 having depending branch pipes 5, of which branch pipes there is one for each stall. In the upper end of the branch pipes 5, there are shown valves 6 by means of which the branch pipes may be independently opened and closed. The numeral 7 indicates a vacuum gage which is in communication with the pipe 4.

The numeral 8 indicates a milk can that is provided with a removable cover 9 of the usual or any suitable construction which will make the can approximately air tight. One of these cans 8 is connected to each branch pipe 5, preferably by means of a flexible hose 10 that opens into the upper portion of said can, preferably through a trap pipe 11. Another flexible hose 12 opens into the upper portion of said can 8, as shown, through said trap 11 and is provided in its other end with branch pipes 13 having teat cups 14 of suitable construction. The apparatus so far specifically described in connection with the drawings is that shown in my said prior patent above identified, but it will, of course, be understood that so far as my present invention is concerned, these features of the apparatus may be of any suitable construction.

The device for producing the pulsation in the vacuum or suction pipes and tubes of the apparatus is preferably located at that end of the pipe 4 which is most distant from the pump connecting pipe 3, and as shown, the said pipe 4 at said extended end, is provided with a T-coupling 15 having axially alined upwardly and downwardly extended tubes 16 and 17, the latter of which constitutes a cylinder in which works a piston 18. Said piston 18 is provided with a depending stem 19 that works through a skeleton head 20 of a cap 21 which, as shown, is applied to the lower end of said cylinder 17 and is provided with an offset arm 22. To the arm 22 is pivoted a trip lever 23 which, as shown, has a perforation through which the piston stem 19 works freely. The stem 19 is provided with a series of perforations and above said lever 23 is provided with a collar 24 which, by means of a suitable pin passed therethrough and through one of the perforations of said stem, may be secured in any desired position thereon. The lower end of the stem 19 is, as shown, telescoped into an axial perforation of a weight 25 and is passed through a bail 26 on the upper end thereof. A pin 27 passed through a perforation below the bail 26 adjustably connects the weight 25 to said piston stem and causes the bail 26 to act as a trip against the bottom of the lever 23. To the upper end of the tube 16 is secured a cap 28, which, as shown, is provided with an axial vent tube 29 that is normally closed by a valve 30 pivoted to a lug 31 on said cap. To another lug 32 on the cap 28, below the projecting free end of the vent valve 30, is pivoted a valve tripping dog 33 in the form of a bell crank. To the lower arm of the bell crank or dog 33 is pivotally attached the upper end of a trip rod 34, the lower end of which is loosely but adjustably connected to the free end of the trip lever 23 by nuts 35 or other suitable devices. A light coiled spring 36 attached to the dog 33 and to the lug 31 is adapted to be moved from one side to another of a dead center with respect to the pivot of the said dog 33, under vibratory movements of the latter.

Fig. 2 illustrates the position of the parts when there is little or no suction or vacuum within the tubes and pipes of the apparatus. When the suction or vacuum within the tubes and pipes of the apparatus approaches a maximum, the piston 18 and weight 25 carried thereby will be raised, thereby throwing the bail 26 against the trip lever 23, raising the latter and, through the trip rod 34, will turn the long upper arm of the dog 33 upward and cause the latter to raise the valve 30 and open the vent 29. The opening of the vent 29, as is evident, allows air to freely flow into the tubes and pipes of the apparatus, thereby decreasing the vacuum or suction and allowing the piston 18 and its weight 25 to drop back to normal position. The valve 30, however, will not be permitted to immediately close as soon as the suction or vacuum is decreased by the admission of air into the tubes of the apparatus, but, on the contrary, will be held open by the spring held dog 33 until the piston 18 and its weight 25 have nearly reached the limit of their downward movement, whereupon, the collar 24 of the stem 19 will strike the trip lever 23 and, through the trip rod 34, will move the dog 33 back to the position shown in Fig. 2, and permit the valve 30 to again close the vent 29. As is obvious, as soon as the vent 29 has thus been closed, the suction from the air pump will again raise the piston 18 and its weight 25. In this way, comparatively long and well defined pulsations will be produced.

In pulsating devices hitherto used, the tendency has been for the relief valve to close as soon as a very slight amount of air has been admitted into the pipes of the apparatus, and this has had a tendency to produce a rapid series of slight fluctuations, as distinguished from relatively long and well defined pulsations under which the suction or vacuum is varied to the material and very much desired extent required for a good milking action. The length of the pulsations and the intensity thereof may be varied by adjustments of the weight 25 and its bail 26 upon the piston rod 19. It is evident that the higher up the said weight and its bail are set on said piston rod, the shorter will be the pulsations and the less the intensity thereof, and the converse of this statement is also thought to be obvious. The arrangement described, therefore, affords means for proper regulation to meet different conditions and requirements of the service.

What I claim is:

1. In a milking apparatus, means for producing pulsations, comprising an automatically actuated vibratory controller subject to varying vacuum or pressure from within said apparatus, a vent opening into the air conduit of said apparatus, a valve for opening and closing said vent, and a valve actuating connection subject to said controller and arranged to remain set in either of its two extreme positions during a material part of the movement of said controller, but which controller is arranged to operate on said actuating connection to open said valve under extreme movement in one direction and to close said valve under extreme movement in the other direction, substantially as described.

2. In a milking apparatus, means for producing pulsations, comprising an automatically actuated vibratory controller subject to varying vacuum or pressure from within said apparatus, a vent opening into the air conduit of said apparatus, a valve for opening and closing said vent, a valve actuating connection subject to said controller and arranged to remain set in either of its two extreme positions during a material part of the movement of said controller, but which controller is arranged to operate on said actuating connection to open said valve under extreme movement in one direction and to close said valve under extreme movement in the other direction, and means for adjusting or varying the action of said controller in respect to the amount of movement required to render the same operative on said valve actuating connection, substantially as described.

3. In a milking apparatus, means for producing pulsations therein, comprising a vent valve controlling and opening into an air conduit of said apparatus, a pivoted tripping dog operative on said vent valve, a spring tending to hold said tripping dog in either of the two positions in which it may be set, a tripping lever, a rod connecting said tripping lever to said tripping dog, and a weighted piston working in a tube of said apparatus and operating on said tripping lever under extreme movements, substantially as described.

In testimony whereof I affix my signature in presence of two witnesses.

EZRA E. GOOD.

Witnesses:
MALIE HOEL,
F. D. MERCHANT.